United States Patent
Kim et al.

(10) Patent No.: US 10,762,995 B2
(45) Date of Patent: Sep. 1, 2020

(54) SHUTDOWN COOLING SYSTEM AND NUCLEAR FACILITY HAVING SAME

(71) Applicant: KOREA ATOMIC ENERGY RESEARCH INSTITUTE, Daejeon (KR)

(72) Inventors: Young In Kim, Daejeon (KR); Keung Koo Kim, Daejeon (KR); Jae Joo Ha, Daejeon (KR); Tae Wan Kim, Daejeon (KR); Hun Sik Han, Seoul (KR); Kyung Jun Kang, Iksan-si (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 166 days.

(21) Appl. No.: 15/520,594

(22) PCT Filed: Oct. 5, 2015

(86) PCT No.: PCT/KR2015/010514
§ 371 (c)(1),
(2) Date: Apr. 20, 2017

(87) PCT Pub. No.: WO2016/064109
PCT Pub. Date: Apr. 28, 2016

(65) Prior Publication Data
US 2018/0308592 A1    Oct. 25, 2018

(30) Foreign Application Priority Data
Oct. 22, 2014   (KR) .................. 10-2014-0143512

(51) Int. Cl.
*G21C 15/18*   (2006.01)
*G21C 1/32*    (2006.01)
(Continued)

(52) U.S. Cl.
CPC ............. *G21C 15/182* (2013.01); *F22D 5/34* (2013.01); *F22D 11/02* (2013.01); *G21C 1/09* (2013.01);
(Continued)

(58) Field of Classification Search
CPC .................................................. G21C 15/182
See application file for complete search history.

(56) References Cited

U.S. PATENT DOCUMENTS 4,588,548 A * 5/1986 Magee .................... G21C 1/09
                                                  376/307
5,006,303 A * 4/1991 Rowlands .............. G21C 15/18
                                                  376/281
(Continued)

FOREIGN PATENT DOCUMENTS

CA    2066828 A1   11/1992
CN   102903402 A    1/2013
(Continued)

OTHER PUBLICATIONS

Jeong et al. Establishment of joint application system of safety analysis codes between Korea and Vietnam. Oct. 2009. 257 pages see p. 86—Slide 1 and Slide 5 attached. Full document available: <https://inis.iaea.org/collection/NCLCollectionStore/Public/43/041/43041435.pdf>. (Year: 2009).*

(Continued)

*Primary Examiner* — Lily C Garner
(74) *Attorney, Agent, or Firm* — Scully Scott Murphy and Presser (57) ABSTRACT

The present disclosure provides a stopped cooling system including: a steam line connecting portion connected to a steam line so as to receive cooling water through the steam line connected to an outlet of a steam generator; a stopped cooling heat exchanger for receiving cooling water that
(Continued)

enters the stopped cooling system through the steam line connecting portion, and discharging same through a passage of the heat exchanger; a stopped cooling pump activated to perform stopped cooling of the nuclear reactor upon normal stoppage of the nuclear reactor after primary cooling of the nuclear reactor cooling system or when an accident occurs, and for forming a circulating flow of cooling water that circulates between the steam generator and the stopped cooling heat exchanger; and a water supplying pipe connecting portion connected to the heat exchanger passage and a water supplying pipe, which is connected to the inlet of the steam generator, so as to supply the cooling water cooled in the stopped cooling heat exchanger to the steam generator through the water supplying pipe.

13 Claims, 8 Drawing Sheets

(51) Int. Cl.
*G21D 1/00* (2006.01)
*F22D 5/34* (2006.01)
*F22D 11/02* (2006.01)
*G21C 1/09* (2006.01)
*G21C 1/18* (2006.01)
*F01K 13/02* (2006.01)
*F22B 1/16* (2006.01)
*F22B 1/18* (2006.01)
*F22B 35/10* (2006.01)
*G21C 13/024* (2006.01)
*G21D 3/06* (2006.01)

(52) U.S. Cl.
CPC ............... *G21C 1/18* (2013.01); *G21C 1/326* (2013.01); *G21D 1/006* (2013.01); *F01K 13/025* (2013.01); *F22B 1/162* (2013.01); *F22B 1/1823* (2013.01); *F22B 35/108* (2013.01); *G21C 13/024* (2013.01); *G21D 3/06* (2013.01); *Y02E 30/40* (2013.01)

(56) References Cited

U.S. PATENT DOCUMENTS

| | | |
|---|---|---|
| 5,343,507 A | 8/1994 | Arnold et al. |
| 2014/0016734 A1 | 1/2014 | Moon et al. |

FOREIGN PATENT DOCUMENTS

| | | | |
|---|---|---|---|
| CN | 202855318 U | | 4/2013 |
| CN | 204229849 U | | 3/2015 |
| GB | 2161643 A | | 1/1985 |
| JP | H08-171000 A | | 7/1996 |
| JP | 2010112772 A | | 5/2010 |
| JP | 2014-504714 A | | 2/2014 |
| KR | 20010076566 A | | 8/2001 |
| KR | 100397291 B1 | * | 9/2003 |
| KR | 100837688 B1 | | 6/2008 |
| KR | 20130023964 A | | 3/2013 |
| KR | 101255588 B1 | * | 4/2013 |
| KR | 20130047871 A | * | 5/2013 |

OTHER PUBLICATIONS

Dai, Shoubao, et al. "Passive Cooldown Performance of Integral Pressurized Water Reactor." Energy and Power Engineering 5.04 (2013): 505. <https://file.scirp.org/pdf/EPE_2013102913484115.pdf>. (Year: 2013).*

System-Integrated Modular Advanced Reactor (SMART). Apr. 4, 2011. 36 pages. <https://aris.iaea.org/sites/..%5CPDF%5CSMART.pdf>. (Year: 2011).*

Chung, Young-Jong, et al.; "Passive Cooldown Performance of a 65 MW Integral Reactor"; Nuclear Engineering and Design 238 (2008), pp. 1681-1689.

Shen-Jin, et al.; "Performance Analysis of Passive Residual Heat Removal System under Blackout Accident of Chinese Integral Advanced Reactor"; Nuclear Power Engineering, vol. 28, No. 6, Dec. 2007, pp. 80-83.

Courtesy Office Action issued in corresponding Chinese Patent Appln. No. 201580069451.3, dated Aug. 30, 2018 with English translation.

International Search Report dated Jan. 20, 2016 issued in PCT/KR2015/010514.

English Abstract of EP 2660513 A1 dated Nov. 6, 2013.

* cited by examiner

SHUTDOWN COOLING SYSTEM AND NUCLEAR FACILITY HAVING SAME

CROSS-REFERENCE TO RELATED APPLICATIONS

This application is the National Stage filing under 35 U.S.C. 371 of International Application No. PCT/KR2015/010514, filed on Oct. 5, 2015, which claims the benefit of earlier filing date and right of priority to Korean Application No. 10-2014-0143512, filed on Oct. 22, 2014, the contents of which are all hereby incorporated by reference herein in their entirety.

TECHNICAL FIELD

The present disclosure relates to a shutdown (or stopped) cooling system for shutdown cooling (stopped cooling) of a nuclear reactor upon normal shutdown of the nuclear reactor or upon an occurrence of an accident, and a nuclear facility having the same.

BACKGROUND ART

Nuclear reactors are classified depending on an installation position of main equipment (steam generator, pressurizer, pump, etc.) into a separate type reactor (e.g., commercial reactor: Korea) in which the main equipment is installed outside a reactor vessel, and an integral type reactor (e.g., SMART reactor: Korea) in which the main equipment is installed inside the reactor vessel.

Unlike general industrial boilers, a nuclear facility (nuclear plant) generates residual heat from a reactor core for a considerable period of time even after the reactor core is shut down by control rods. Accordingly, various safety facilities are intensively installed in the nuclear facility in order to maintain the reactor in a stable state by removing the residual heat of the reactor core when an accident occurs. In addition, various facilities, such as a secondary system, a shutdown cooling system, and the like, which operate during a normal reactor shutdown operation.

A steam generator of a commercial separate type reactor is separated from a reactor and installed at a higher position than the reactor. In a commercial separate type nuclear facility, during a normal reactor cooling operation, a reactor coolant system is primarily cooled using a secondary system, and thereafter a primary system is cooled by directly injecting cooling water using a shutdown cooling system. And, in the commercial separate type nuclear facility, during a normal cooling operation or a cooling operation due to an accident, the reactor coolant system is primarily cooled using a main or auxiliary feed water system and the secondary system, and thereafter the primary system is cooled by directly injecting cooling water using the shutdown cooling system constructing a part of a safety system.

A steam generator of an integral type reactor such as SMART is installed inside a reactor vessel and installed at a position which is higher than a position of a reactor core but lower than the position of the steam generator of the commercial separate-type nuclear reactor. In the integral type reactor having a passive residual heat removal system, during a normal reactor cooling operation, a reactor coolant system is primarily cooled using a feed water system and a secondary system, and thereafter a primary system is cooled by directly injecting cooling water using a shutdown cooling system. And, in the integral type reactor, during a cooling operation due to an accident, the reactor coolant system is primarily cooled using the passive residual heat removal system and the steam generator, and thereafter the primary system is cooled by directly injecting cooling water using the shutdown cooling system.

However, the related art shutdown cooling system having such structure is provided with a line (or a pipe) that is directly connected to the reactor vessel. Accordingly, when the line is damaged, a loss-of-coolant accident may occur. Also, the reactor vessel is opened during the shutdown cooling operation in the related art shutdown cooling system. Thus, in order to secure a suction head of a shutdown cooling pump, the shutdown cooling pump is generally installed at the lowermost part of a nuclear facility containment building and a line of a suction part thereof is designed to be great.

For the integral type reactor, a diameter of a connection nozzle for connecting the line to the reactor vessel is related to strength of a line break accident. Hence, when the diameter of the nozzle increases, an effect of eliminating a large loss-of-coolant accident, which is an inherent characteristic of the integral type reactor, is impacted. Thus, in general, the integral type reactor meets suction head conditions by reducing the diameter of the nozzle connected to the reactor vessel (reactor coolant system) and thereafter increasing the diameter of the connection line. However, in this integral type reactor, flow resistance occupied by the connection nozzle of the reactor vessel is very large, so there is a limit to reduce the flow resistance. Accordingly, a design of gradually cooling the reactor coolant system by adopting a method of reducing a flow rate in the shutdown cooling system is applied. Because of this design characteristic, the integral type reactor generally is required more time to perform the shutdown cooling operation (reaching reload temperature) than the commercial reactor.

Also, in general, the related art shutdown cooling system is directly connected to the reactor coolant system. The shutdown cooling system is thereafter connected to a component cooling system, and the component cooling system is then connected to a seawater system. The reason why the component cooling system is installed between the shutdown cooling system and the seawater system is to prevent cooling water of the reactor coolant system, which is directly connected to the nuclear reactor core and thus contains a radioactive material, from directly exchanging heat with seawater. In other words, an intermediate circulation channel (loop) (component cooling system) is provided to prevent the cooling water of the reactor coolant system from being discharged directly to the seawater when the heat exchanger is damaged. With this configuration, the related art shutdown cooling system requires many related systems and heat exchangers.

DISCLOSURE OF THE INVENTION

Therefore, to obviate those problems, an aspect of the detailed description is to provide a shutdown cooling system configured using a secondary flow path of a steam generator to overcome the limits of the related art shutdown cooling system, and a nuclear facility having the same.

Another aspect of the detailed description is to provide a shutdown cooling system capable of mitigating a suction head by employing a pressure controller, and a nuclear facility having the same.

Another aspect of the detailed description is to provide a shutdown cooling system simplified by excluding a component cooling system, which is configured using a secondary flow path of a steam generator, in order to overcome the limits of the related art shutdown cooling system, and a nuclear facility having the same.

To achieve these and other advantages and in accordance with the purpose of the present invention, as embodied and broadly described herein, there is provided a shutdown cooling system, comprising:

a steam line connecting portion connected to a steam line so as to receive cooling water through the steam line, the steam line connected to an outlet of a steam generator, a shutdown cooling heat exchanger to receive cooling water introduced into the shutdown cooling system through the steam line connecting portion, and cool the cooling water heated up while circulating along a secondary flow path of the steam generator to discharge into a heat exchanger channel, a shutdown cooling pump activated to perform shutdown cooling of a reactor upon a normal shutdown of the reactor after primary cooling of a reactor coolant system or upon an occurrence of an accident, so as to form a circulation flow of the cooling water circulating along the steam generator and the shutdown cooling heat exchanger, and a feed water line connecting portion connected to the heat exchanger channel and a feed water line connected an inlet of the steam generator, so as to supply the cooling water cooled in the shutdown cooling heat exchanger to the steam generator along the feed water line.

According to one embodiment disclosed herein, the steam line connecting portion may include a suction line connected to the steam line and the shutdown cooling pump, and a first valve installed in the suction line, the first valve closed during a normal operation of the reactor and opened after the primary cooling of the reactor coolant system. The feed water line connecting portion may include a discharge line connected to the heat exchanger channel and the feed water line, and a second valve installed in the discharge line, the second valve closed during the normal operation of the reactor and opened after the primary cooling of the reactor coolant system.

The shutdown cooling system may further include a connection channel forming a flow path connecting the shutdown cooling pump and the shutdown cooling heat exchanger, and a check valve installed in the connection channel to prevent a formation of a reverse flow from the shutdown cooling heat exchanger toward the shutdown cooling pump.

The shutdown cooling system may further include a bypass channel branched from the connection channel and connected to the discharge line to control a flow rate of the cooling water supplied from the shutdown cooling pump to the shutdown cooling heat exchanger.

The shutdown cooling system may further include a recirculation channel branched from the heat exchanger channel and connected to the suction line to form a flow path for resupplying the cooling water discharged from the shutdown cooling heat exchanger to the shutdown cooling pump.

According to another embodiment disclosed herein, the shutdown cooling system may further include a pressure controller connected to a flow path of the circulation flow to pressurize the flow path of the circulation flow, such that operation pressure of the shutdown cooling system is maintained to be higher than preset pressure.

The pressure controller may pressurize the flow path of the circulation flow using gas.

The pressure controller may pressurize the flow path of the circulation flow by heating up steam using a heater.

According to another embodiment disclosed herein, the steam generator may include at least one of a shell-and-tube type steam generator provided with a primary flow path configured as one of a shell and a tube, and a secondary flow path configured as another one, a plate type steam generator configured as at least one of a printed circuit type steam generator and a plate type steam generator, and a mixed type steam generator of the shell-and-tube type steam generator and the plate type steam generator.

According to another embodiment disclosed herein, the shutdown cooling heat exchanger may include at least one of a shell-and-tube type heat exchanger provided with a secondary flow path configured as one of a shell and a tube, and a tertiary flow path configured as another one, and a plate type heat exchanger configured as at least one of a printed circuit type steam generator and a plate type steam generator.

The tertiary flow path of the shutdown cooling heat exchanger may be supplied with at least one of component cooling water supplied from a component cooling system, seawater supplied from the sea, and atmosphere supplied from a cooling tower.

According to another embodiment disclosed herein, the shutdown cooling pump may be a feed water pump or an auxiliary feed water pump.

Also, to achieve those aspects, the present invention provides a nuclear facility having a shutdown cooling system. The nuclear facility may include a steam generator having an inlet connected to a feed water line for receiving a secondary fluid from a feed water system, and an outlet connected to a steam line for supplying the secondary fluid to a turbine system, and a shutdown cooling system to perform shutdown cooling of a reactor during a normal shutdown or an accident of the reactor. The shutdown cooling system may include a steam line connecting portion connected to a steam line for receiving cooling water through the steam line, the steam line connected to the outlet of the steam generator, a shutdown cooling heat exchanger to receive the cooling water through the steam line connecting portion and cool the cooling water heated up while circulating along a secondary flow path of the steam generator, a shutdown cooling pump activated to perform the shutdown cooling of the reactor upon the normal shutdown of the reactor after primary cooling of a reactor coolant system or upon an occurrence of an accident, so as to form a circulation flow of the cooling water circulating along the steam generator and the shutdown cooling heat exchanger, and a feed water line connecting portion connected to the feed water line connected to the inlet of the steam generator to supply the cooling water cooled in the shutdown cooling heat exchanger to the steam generator along the feed water line.

According to one embodiment disclosed herein, the nuclear facility may further include (a) a passive residual heat removal system or (b) a feed water system and a secondary system configured to primarily cool the reactor coolant system prior to an operation of the shutdown cooling system during an accident.

ADVANTAGEOUS EFFECT

According to the present invention having such configuration, a shutdown cooling system connected to a feed water line and a steam line of a steam generator and using a secondary system has been proposed. Therefore, the present invention can remove a loss of coolant accident which is likely to be caused due to damage on a line in the shutdown cooling system having a low-temperature cooling function for maintenance and the like of a nuclear facility.

The present invention can provide a fundamental solution to problems of securing a suction head of a shutdown cooling pump and a flow rate for shutdown cooling by use of a pressure controller.

The present invention has proposes a method allowing for simplifying the shutdown cooling system by removing a intermediate circulation loop (component cooling system) by selectively using a boundary of the steam generator, in order to improve economical efficiency of the nuclear facility.

The present invention has proposes a method allowing for additionally providing a boundary of the steam generator between a reactor coolant and an environment (seawater or atmosphere) when the intermediate circulation loop (component cooling system) is selectively employed in the related art manner, in order to improve safety of the nuclear facility.

Also, the present invention has proposes various configurations for selectively increasing a capacity of the steam generator according to a requirement of the shutdown cooling system depending on the nuclear facility.

MODES FOR CARRYING OUT THE PREFERRED EMBODIMENTS

Hereinafter, description will be given in more detail of a shutdown cooling system (or a stopped cooling system) and a nuclear facility having the same in accordance with the present invention, with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context.

Figure 1:
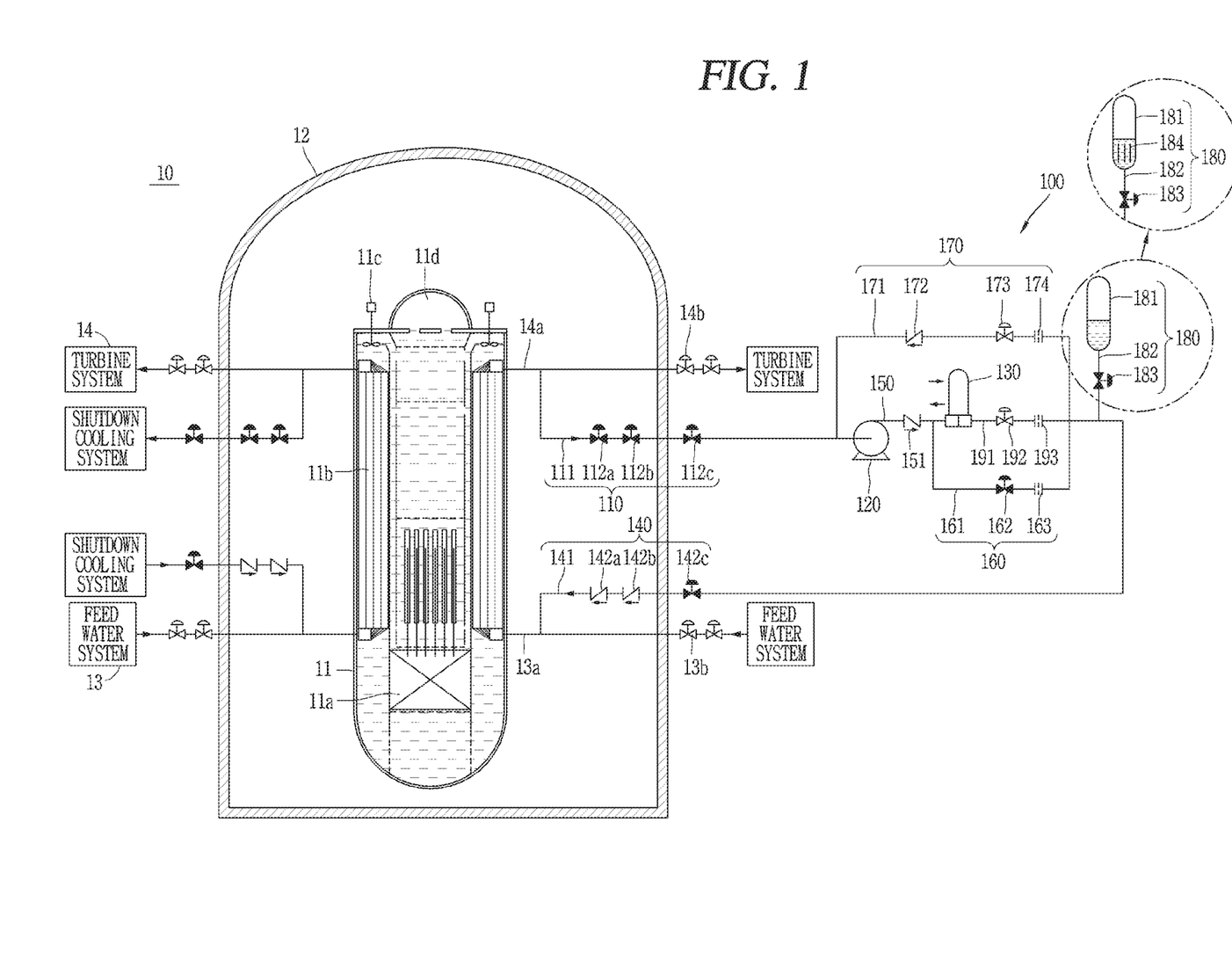
FIG. 1 is a conceptual view illustrating a shutdown cooling system and a nuclear facility having the same, in accordance with one embodiment of the present invention.

FIG. 1 is a conceptual view illustrating a shutdown cooling system 100 and a nuclear facility 10 having the same in accordance with one embodiment of the present invention.

The nuclear facility 10 includes a containment 12, a reactor coolant system 11, a core 11a, a steam generator 11b, a reactor coolant pump 11c, and a pressurizer 11d. In addition to those components illustrated in FIG. 1, the nuclear facility 10 may include systems for a normal operation of the nuclear facility 10, and various systems for securing safety of the nuclear facility 10.

The reactor coolant system 11 is installed inside the containment 12. The reactor coolant system 11 is a coolant system for transferring and transporting heat energy generated by nuclear fission in the core 11a. The inside of the reactor coolant system 11 is filled with a primary fluid. When an accident such as a loss of coolant occurs, steam may be discharged from the reactor coolant system 11, and the containment 12 may prevent a leakage of a radioactive material to outside.

The steam generator 11b forms a boundary between the primary fluid (reactor coolant) and a secondary fluid (feed water, steam) and generates steam by using heat transferred from the core 11a. A lower inlet of the steam generator 11b is connected to a feed water system 13 by a feed water line 13a and an upper outlet of the steam generator 11b is connected to a turbine system 14 by a steam line 14a. Water fed to the steam generator 11b through the feed water line 13a is evaporated in the steam generator 11b to become steam. The steam is supplied to the turbine system 14 through the steam line 14a.

Generally, a line having a relatively large diameter is generally applied as the feed water line 13a and the steam line 14a connected to a secondary flow path of the steam generator 11b. Also, for an integral type reactor, a large-capacity shutdown cooling line may be designed when the shutdown cooling system is constructed using the secondary flow path of the steam generator 11b, rather than using a connection nozzle connected to a reactor vessel. When the secondary flow path of the steam generator 11b is used, a pump suction head and a shutdown cooling flow rate can sufficiently be secured, which may result in shortening a time required for shutdown cooling. Shortening the time required for the shutdown cooling may arouse an effect of reducing a shutdown period for reloading and maintenance, thereby increasing economical efficiency of the nuclear facility 10.

Also, the shutdown cooling system 100 is generally connected directly to the reactor coolant system 11. The shutdown cooling system 100 is then connected to a component cooling system (not illustrated) and the component cooling system is connected to a seawater system or a cooling tower (not illustrated). The reason why the component cooling system is interposed is that the component cooling system plays a role of preventing cooling water of the reactor coolant system 11 from being directly discharged into seawater or atmosphere when a heat exchanger of the shutdown cooling system 100 is damaged.

The reactor coolant pump 11c induces a circulation of the primary fluid and the pressurizer 11d maintains a pressurized state over saturation pressure in order to suppress boiling of the coolant in the core 11a of a pressurized water reactor.

The containment 12 encloses the reactor coolant system 11 to prevent the radioactive material from being leaked to an external environment. When an accident such as a loss of coolant or a non-loss of coolant occurs, the radioactive material may be likely to be leaked from the reactor coolant system 11. Therefore, the containment 12 is configured to enclose the reactor coolant system 11 at the outside of the reactor coolant system 11, so as to prevent the leakage of the radioactive material.

The containment 12 serves as a final barrier to prevent the leakage of the radioactive material from the nuclear facility 10 to the external environment. The containment 12 is divided into a containment building (or reactor building) made of reinforced concrete, vessel containment vessel and a safeguard vessel made of steel, depending on a material constituting a pressure boundary. The containment vessel is a large vessel designed under low pressure, like the containment building, and the safeguard vessel is a small vessel designed to be small by increasing design pressure. Unless otherwise specified, in the present invention, the containment 12 is used as a term which includes all of the containment building, the reactor building, the containment vessel, or the safeguard vessel.

The shutdown cooling system 100 is a system for shutdown cooling of the reactor when the reactor is normally shut down or an accident occurs in the reactor. During the normal shutdown or the shutdown due to an accident of the reactor, the reactor is primarily cooled from a normal operation temperature down to about 200° C. by a feed water system, a secondary system, or a passive residual heat removal system. The shutdown cooling system 100 is a subsequent cooling system that is driven after the completion of the primary cooling so as to cool the reactor down to a reloading temperature of about 50° C.

The shutdown cooling system 100 includes a steam line connecting portion 110, a shutdown cooling heat exchanger 130, a shutdown cooling pump 120, and a feed water line connecting unit 140.

The steam line connecting portion 110 and the feed water line connecting portion 140 are components necessary for the shutdown cooling system 100 to utilize the secondary flow path of the steam generator 11*b*. The steam line 14*a* is connected to an outlet of the secondary flow path of the steam generator 11*b* and the feed water line 13*a* is connected to an inlet of the secondary flow path of the steam generator 11*b*. The steam line connecting portion 110 is connected to the steam line 14*a* to receive cooling water through the steam line 14*a*. The feed water line connecting portion 140 is connected to the feed water line 13*a* to supply the cooling water to the steam generator 11*b*.

The steam line connecting portion 110 includes a suction line 111 and a first valve 112*a*, 112*b*, 112*c*.

The suction line 111 is connected to the steam line and the shutdown cooling pump 120. The suction line 111 forms a flow path through which the cooling water is introduced from the steam line 14*a*. The suction line 111 generally has a large diameter in order to sufficiently secure the suction head of the shutdown cooling system 100. The suction line 111 is provided with the first valve 112*a*, 112*b*, 112*c*. The first valve 112*a*, 112*b*, 112*c* includes at least one of an isolation valve 112*a*, 112*b*, 112*c* and a check valve (not illustrated), and may be provided in plural. Specifically, the isolation valve 112*a*, 112*b*, 112*c* is generally provided in plural for safe isolation. The first valve 112*a*, 112*b*, 112*c* is closed during the normal operation of the reactor and are opened after the primary cooling of the reactor coolant system 11.

The feed water line connecting portion 140 includes a discharge line 141 and a second valve 142*a*, 142*b*, 142*c*.

The discharge line 141 is connected to a heat exchanger channel 191 and the feed water line 13*a*. The discharge line 141 is connected to the heat exchanger channel 191 to form a flow path through which cooling water cooled in the shutdown cooling heat exchanger 130 is fed into the steam generator 11*b*. The discharge line 141 is provided with the second valve 142*a*, 142*b*, 142*c*. The second valve 142*a*, 142*b*, 142*c*, similar to the first valve 112*a*, 112*b*, 112*c*, includes at least one of an isolation valve 142*c* and a check valve 141*a*, 141*b*, and is provided in plural. Specifically, the isolation valve 141*c* is generally installed in plural for safe isolation, but may be exclusive in case where the check valve 141*a*, 141*b* is installed in an opposite direction to a flowing direction during the normal operation of the nuclear facility 10. The second valve 142*a*, 142*b*, 142*c* is closed during the normal operation of the reactor and is open after the primary cooling of the reactor coolant system 11.

The isolation valve 112*a*, 112*b*, 112*c*, and 142*c* may be opened by an operator's determination at a time point when the shutdown cooling operation is required. Also, when the isolation valve 112*a*, 112*b*, 112*c*, and 142*c* is opened at the time point that the shutdown cooling operation is required and the shutdown cooling pump 120 is operated, the check valve 142*a*, 142*b* may be opened. This is equally applied to the other isolation valves 162, 172, 173, and 183 and the check valves illustrated in FIG. 1. However, valves installed for maintenance and the like may also be operated in an open state during the normal operation of the nuclear power plant 10. In the present invention, the isolation valve generally refers to a valve operated by various motor-driving methods, such as a motor, air or a pilot, and is not limited to a valve that performs only the isolation function.

The shutdown cooling system 100 is connected to the steam generator 11*b* by the steam line connecting portion 110 and the feed water line connecting portion 140. Accordingly, the steam generator 11*b*, the steam line connecting portion 110, and the feed water line connecting portion 140 form a circulation channel for the cooling water. The shutdown cooling system 100 receives cooling water which is heated while passing through the secondary flow path of the steam generator 11*b* through the steam line connecting portion 110, and feeds cooling water which is cooled in the shutdown cooling heat exchanger 130 into the secondary flow path of the steam generator 11*b* through the feed water line connecting portion 140. The cooling water flows into the shutdown cooling system 100 through the steam line connecting portion 110 and is discharged from the shutdown cooling system 100 through the feed water line connecting portion 140.

The steam generator 11*b* installed in the nuclear facility 10 of FIG. 1 is a shell-and-tube type steam generator 11*b*. The shell-and-tube type steam generator 11*b* has a primary flow path configured as one of the shell or the tube and a secondary flow path configured as another one. The tube may be formed as a linear tube or a spiral tube. The primary flow path is configured as the shell and the secondary flow path is configured as the tube in the nuclear facility 10 of FIG. 1.

The shutdown cooling heat exchanger 130 receives the cooling water introduced through the steam line connecting portion 110. The shutdown cooling heat exchanger 130 is configured to cool cooling water which is heated by sensible heat of the reactor coolant system 11 and residual heat of the core 11*a* while circulating along the secondary flow path of the steam generator 11*b*. In FIG. 1, arrows given on the shutdown cooling heat exchanger 130 indicate introduction and discharge of seawater, external atmosphere, or component cooling water.

When the steam generator 11b is used, the component cooling system may be removed. However, depending on the nuclear facility 10, the component cooling system may also be used as it is for special purposes such as safety improvement and the like. Also, a final heat sink of the shutdown cooling system 100 may be seawater when the nuclear facility 10 is installed close to the seashore, or may be external atmosphere using a cooling tower when it is installed far from the seashore.

The cooling water that circulates through the steam generator 11b and the shutdown cooling system 100 is cooled by an operation of the shutdown cooling heat exchanger 130. While the cooling water continuously circulates along a circulation channel connected to the steam generator 11b, the cooling water receives sensible heat of the reactor coolant system 11 and residual heat of the core 11a and is cooled in the shutdown cooling heat exchanger 130. By repeating this process, the reactor may be cooled down to a reloading temperature of about 50° C.

The shutdown cooling pump 120 is operated for the shutdown cooling of the reactor after the primary cooling of the reactor coolant system 11 by the passive residual heat removal system or the feed water system and the secondary system upon an occurrence of a normal shutdown or an accident of the reactor. The shutdown cooling pump 120 forms a circulation flow of the cooling water that circulates along the steam generator 11b and the shutdown cooling heat exchanger 130. In addition, the shutdown cooling pump 120 is not necessarily installed independently, and the function of the shutdown cooling pump 120 may also be replaced by using other pumps, such as a feed water pump or an auxiliary feed water pump, to improve the economical efficiency of the nuclear power plant 10.

The shutdown cooling system 100 further includes a connection channel 150, a bypass channel 161, and a recirculation channel 171.

The shutdown cooling pump 120 is connected to the shutdown cooling heat exchanger 130 through the connection channel 150. The connection channel 150 forms a flow path connecting the shutdown cooling pump 120 and the shutdown cooling heat exchanger 130. The cooling water is supplied to the shutdown cooling heat exchanger 130 by the shutdown cooling pump 120. The cooling water then flows from the shutdown cooling pump 120 to the shutdown cooling heat exchanger 130 along the connection channel 150.

A check valve 151 may be installed in the connection channel 150. The flow of the cooling water from the shutdown cooling pump 120 toward the shutdown cooling heat exchanger 130 corresponds to a forward flow and the flow of the cooling water from the shutdown cooling heat exchanger 130 toward the shutdown cooling pump 120 corresponds to a reverse flow. The check valve 151 prevents the generation of the reverse flow.

A heat exchanger channel 191 is connected to the shutdown cooling heat exchanger 130 and the discharge line 141. The heat exchanger channel 191 corresponds to a main flow path for circulating the cooling water normally during the operation of the shutdown cooling system 100. The cooling water cooled in the shutdown cooling heat exchanger 130 flows toward the discharge line 141 along the heat exchanger channel. The heat exchanger channel 191 may be provided with an isolation valve 192 and a flow control portion 193. The flow control portion 193 may include an orifice or venturi and may be configured to limit a flow rate to a designed flow rate required by the shutdown cooling system 100.

The bypass channel 161 is for controlling a cooling rate by the shutdown cooling system 100. The bypass channel 161 is branched from the connection channel 150 and connected to the discharge line 141 so as to control the flow rate of the cooling water supplied from the shutdown cooling pump 120 to the shutdown cooling heat exchanger 130.

The cooling rate should be controlled when the reactor coolant system 11 is cooled too quickly by the operation of the shutdown cooling system 100. The bypass channel 161 is configured to bypass a part of the cooling water discharged from the shutdown cooling pump 120 to flow toward the shutdown cooling heat exchanger 130.

The recirculation channel 171 is for protecting the shutdown cooling pump 120. The recirculation channel 171 is branched from the heat exchanger channel 191 and connected to the suction line 111 so as to form a flow path for re-supplying the cooling water discharged from the shutdown cooling heat exchanger 130 to the shutdown cooling pump 120. A suction flow rate may be supplied to the shutdown cooling pump 120 through the recirculation channel 171 even in a state where the shutdown cooling pump 120 is operated and the second valve 142a, 142b, 142c installed in the discharge line 141 is not open. The recirculation channel 171 may also be used for inspecting the shutdown cooling pump 120 during the operation of the shutdown cooling pump 120.

A pressure controller 180 is for controlling operation pressure of the shutdown cooling system 100. The pressure controller 180 is connected to a flow path of a circulation flow to pressurize the flow path of the circulation flow such that the operation pressure of the shutdown cooling system 100 is maintained to be higher than preset pressure. An evaporation temperature (or saturation temperature) of the cooling water is increased by the pressure controller 180. As the pressure rises, the evaporation temperature rises and consequently the condition of the suction head can be improved. Even if pressure in a pump impeller is lowered, background pressure is increased by the pressure controller 180, thereby maintaining the pressure to be higher than the saturation pressure.

The pressure controller 180 may pressurize the flow path of the circulating flow in a manner of using gas or heating steam with a heater 184. The method using gas may be configured in a pressurizing manner using nitrogen gas applied to a safety injection tank. The method of heating the steam with the heater 184 may be configured in a heater-spraying manner applied to the pressurizer 11d of the commercial reactor.

The pressure controller 180 illustrated in FIG. 1 employs the method using gas. A pressure control tank 181 is connected to the discharge line 141 through a line 182 and an isolation valve 183 is provided on the discharge line 141. The flow path of the circulation flow is pressurized by the nitrogen gas stored in the pressure control tank 181.

However, the present invention describes that the shutdown cooling system 100 is separately constructed for the sake of explanation. Alternatively, the shutdown cooling system 100 may be configured in a form combined with the component cooling system, for example, in a form of receiving cooling water directly from the related art component cooling system to the steam generator 11b and then collecting cooling water, which has been heated up in the steam generator 11b, back into the component cooling system.

FIG. 1 illustrates a normal operation state of the nuclear facility 10 in which the shutdown cooling system 100 is not operated.

Valves 13b and 14b provided in the feed water line 13a and the steam line 14a are opened during the normal operation state of the nuclear facility 10. Accordingly, water is fed from the feed water system 13 to the steam generator 11b along the feed water line 13a, and heated up by the steam generator 11b to become steam. The steam is supplied to the turbine system 14 along the steam line 13a. The steam is used to generate electricity in the turbine system 14.

The valves 112a, 112b, 112c, 142a, 142b and 142c provided in the steam line connecting portion 110 and the feed water line connecting portion 140 are closed during the normal operation of the nuclear facility 10. Therefore, during the normal operation of the nuclear power plant 10, the flow of cooling water is not formed in the circulation channel, and also the flow of the cooling water is not formed in the connection channel 150, the heat exchanger channel 191, the bypass channel 161 and the recirculation channel 171. Also, the shutdown cooling pump 120 and the shutdown cooling heat exchanger 130 do not operate.

Figure 2:
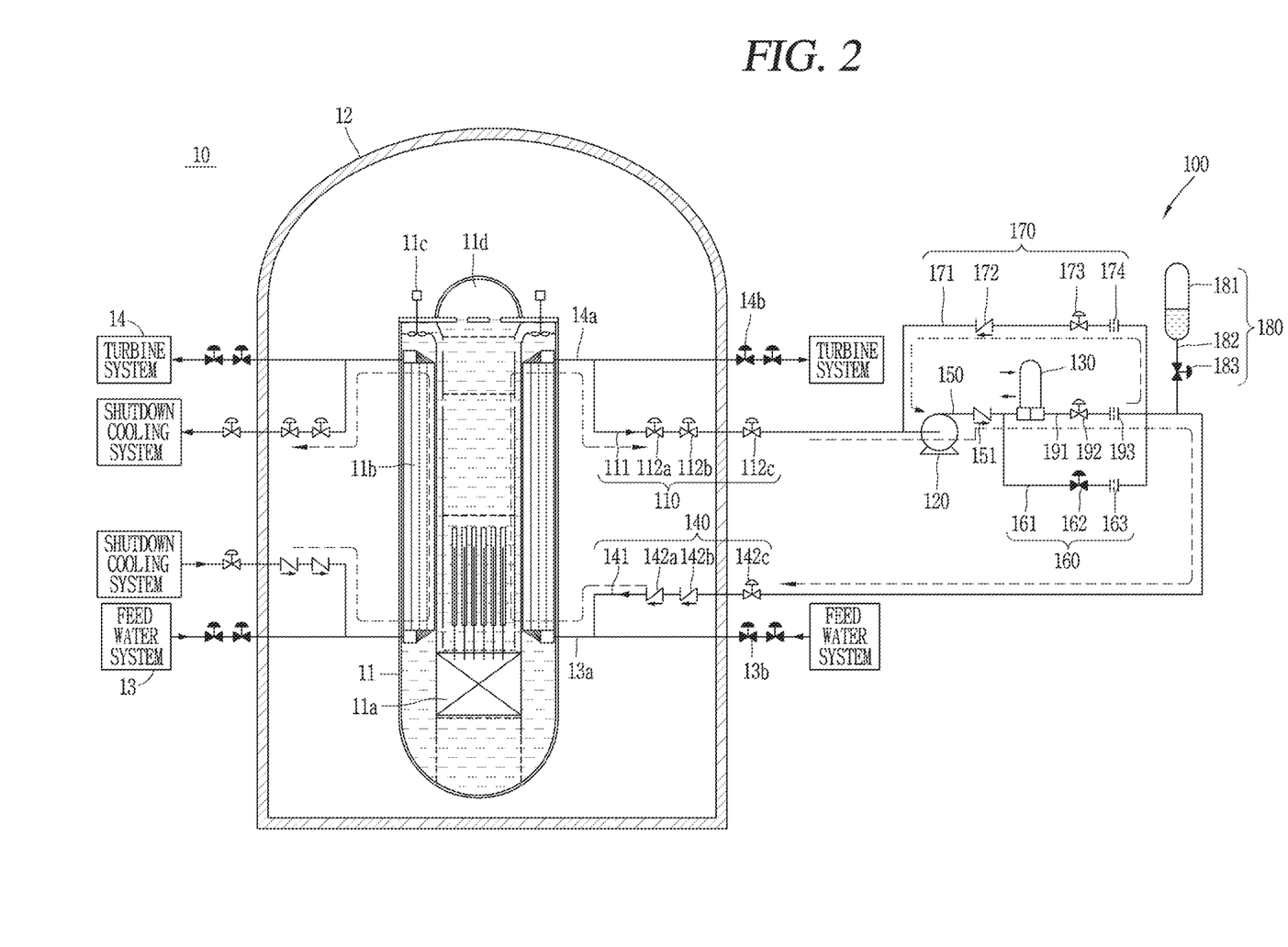
FIG. 2 is a conceptual view illustrating a state of the shutdown cooling system illustrated in FIG. 1 during a shutdown cooling operation.

FIG. 2 is a conceptual view illustrating a state of the shutdown cooling system 100 illustrated in FIG. 1 during the shutdown operation.

During the normal shutdown of the reactor, the reactor is primarily cooled by using the feed water system 13 and the steam generator 11b. The primary cooling using the feed water system 13 and the steam generator 11b is stopped when the temperature of the reactor coolant system 11 reaches about 200° C. although there is a temperature difference depending on the characteristics of the nuclear facility 10. Then, the shutdown cooling system 100 is operated to secondarily cool the reactor cooling system 11 from about 200° C. down to a reloading temperature of about 50° C.

Even during an accident, the reactor coolant system 11 is primarily cooled by using the feed water system 13 (main or auxiliary feed water system) and the steam generator 11b or the passive residual heat removal system (not illustrated). When the temperature of the reactor coolant system 11 reaches about 200° C. although there is the temperature difference depending on the characteristic of the nuclear facility 10, the shutdown cooling system 100 is operated to secondarily cool the reactor coolant system 11 from about 200° C. down to the reloading temperature of about 50° C.

When the temperature of the reactor coolant system 11 reaches a preset temperature by the primary cooling, an auxiliary system (not illustrated) is used to fill the circulation channel of the shutdown cooling system 100. The feed water system may also be used as the auxiliary system. Afterwards, the shutdown cooling pump 120 is operated, and seawater, external atmosphere or component cooling water is supplied to the shutdown cooling heat exchanger 130 by a seawater system, a cooling tower, or a component cooling system (not illustrated).

The cooling water is circulated along the recirculation channel 171 when the shutdown cooling pump 120 is operated but the second valve 142a, 142b, 142c provided in the discharge line 141 is not open. Accordingly, the present invention can supply a sufficient suction flow rate for the shutdown cooling pump 120 and protect the shutdown cooling pump 120.

The first valve 112a, 112b and 112c and the second valve 142a, 142b and 142c provided in the suction line 111 and the discharge line 141 are open and thus the circulation flow of the cooling water is formed in the circulation channel of the shutdown cooling system 100. The cooling water discharged from the steam generator 11b along the steam line 13a flows into the shutdown cooling system 100 through the steam line connecting portion 110 to be supplied into the shutdown cooling heat exchanger 130.

When it is necessary to adjust the cooling rate of the reactor coolant system 11, the isolation valve 162 provided in the bypass channel 161 is open. Accordingly, a part of the cooling water passes through the bypass channel 161 and the flow rate of the cooling water supplied to the shutdown cooling heat exchanger 130 is reduced, which may result in adjusting the cooling rate.

As illustrated in FIG. 2, in the shutdown cooling system 100 employing the pressure controller 180 closed by the isolation valve 182, the isolation valve 182 is opened so that the pressure of the shutdown cooling system 100 is maintained to be higher than the saturation pressure.

During the shutdown cooling operation, the cooling water of the shutdown cooling system 100 supplied to the steam generator 11b is heated up by heat exchange with the reactor coolant system 11 while flowing upward along the secondary flow path of the steam generator 11b. The coolant in the reactor coolant system 11 is cooled. The temperature-increased cooling water in the shutdown cooling system 100 is supplied into the shutdown cooling heat exchanger 130 by a driving force of the shutdown cooling pump 120. The cooling water is then cooled and circulated back to the steam generator 11b. The reactor is secondarily cooled to a low temperature by the operation of the shutdown cooling system 100, in which the cooling water is continuously circulated.

The present invention has configured the shutdown cooling system 100 connected to the steam generator 11b. This configuration can remove the reactor vessel connection nozzle related to the shutdown cooling system 100 as compared with the related art technology. Therefore, the line configuration of the reactor coolant system 11 can be simplified, and probability of occurrence of a loss of coolant accident can fundamentally be lowered. Also, since the flow condition of the shutdown cooling system 100 can be maintained relatively constant regardless of the state of the reactor coolant system 11, the operation of the shutdown cooling system 100 can be simplified.

When the temperature of the reactor coolant system 11 reaches about 50° C., the commercial separate type reactor opens an upper cover of the reactor. When the upper cover is open, the steam generator 11b is mostly exposed to a water level up to a lower end thereof. This causes difficulty in constructing the shutdown cooling system 100 using the steam generator 11b. On the other hand, for the integral type reactor, even when an upper cover of a reactor vessel is open, the steam generator 11b can maintain the water level, and thus it is easy to construct the shutdown cooling system 100 using the steam generator 11b. In addition, since the steam generator 11b is installed in plural, the shutdown cooling system 100 can advantageously be operated in a circulating manner even when some of the steam generators 11b are partially maintained.

In particular, unlike the commercial separate type reactor, the integral type reactor is very advantageous for cooling the reactor coolant system 11 using the steam generator 11b because the steam generator 11b is installed inside the reactor vessel. Therefore, the present invention can maximize its advantages when applied to the integral type reactor.

In addition, the integral type reactor has a limit in size of a line due to its inherent characteristic, but employs the very large feed water line 13a and steam line 14a, as compared with the reactor vessel connection nozzle. Therefore, when the shutdown cooling system 100 is connected to the feed water line 13a and the steam line 14a, it is advantageous to secure the circulation flow rate and the suction head of the shutdown cooling pump 120.

Also, since the steam generator 11b can form another boundary, a component cooling system installed for the same purpose can be removed, which is very advantageous from the perspective of economical efficiency.

Hereinafter, different embodiments of the present invention will be described.

Figure 3:
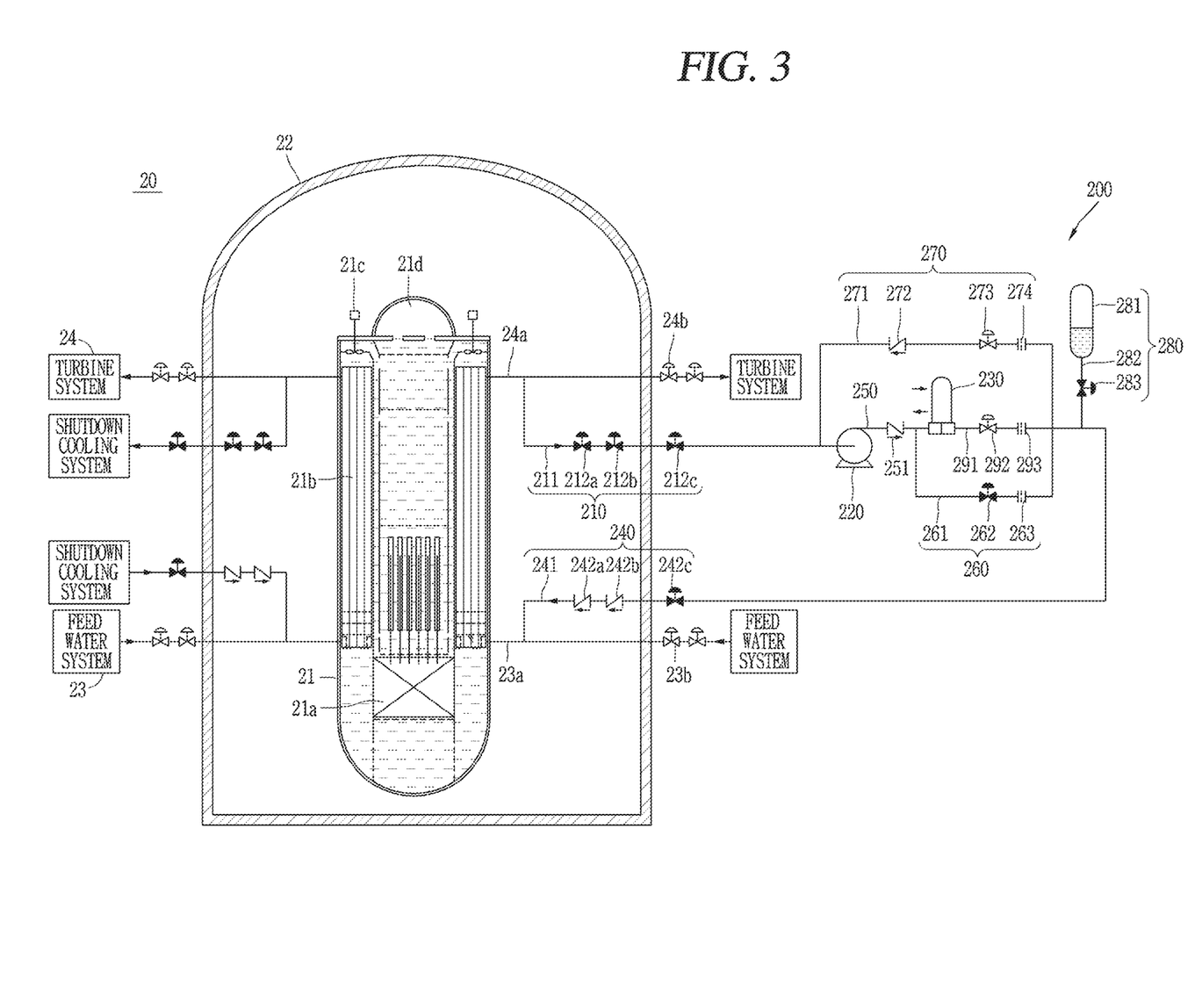
FIG. 3 is a conceptual view illustrating a shutdown cooling system and a nuclear facility having the same, in accordance with another embodiment of the present invention.

FIG. 3 is a conceptual view illustrating a shutdown cooling system 200 and a nuclear facility 20 having the same according to another embodiment of the present invention.

A flow path of a shell-and-tube type steam generator 21b of the nuclear facility 20 may be selectively changed. Unlike the nuclear facility 10 of FIG. 1, the shell-and-tube type steam generator 21b employed in the nuclear facility 20 of FIG. 3 has a secondary flow path configured as a shell and a primary flow path configured as a tube.

As can be seen from FIGS. 1 and 3, the method of configuring the shell and the tube in the shell-and-tube type steam generator 11b, 21b disclosed herein may selectively be implemented as one of the method using the shell as the primary flow path and the tube as the secondary flow path, and the method of using the shell as the secondary flow path and the tube as the primary flow path.

Figure 4:
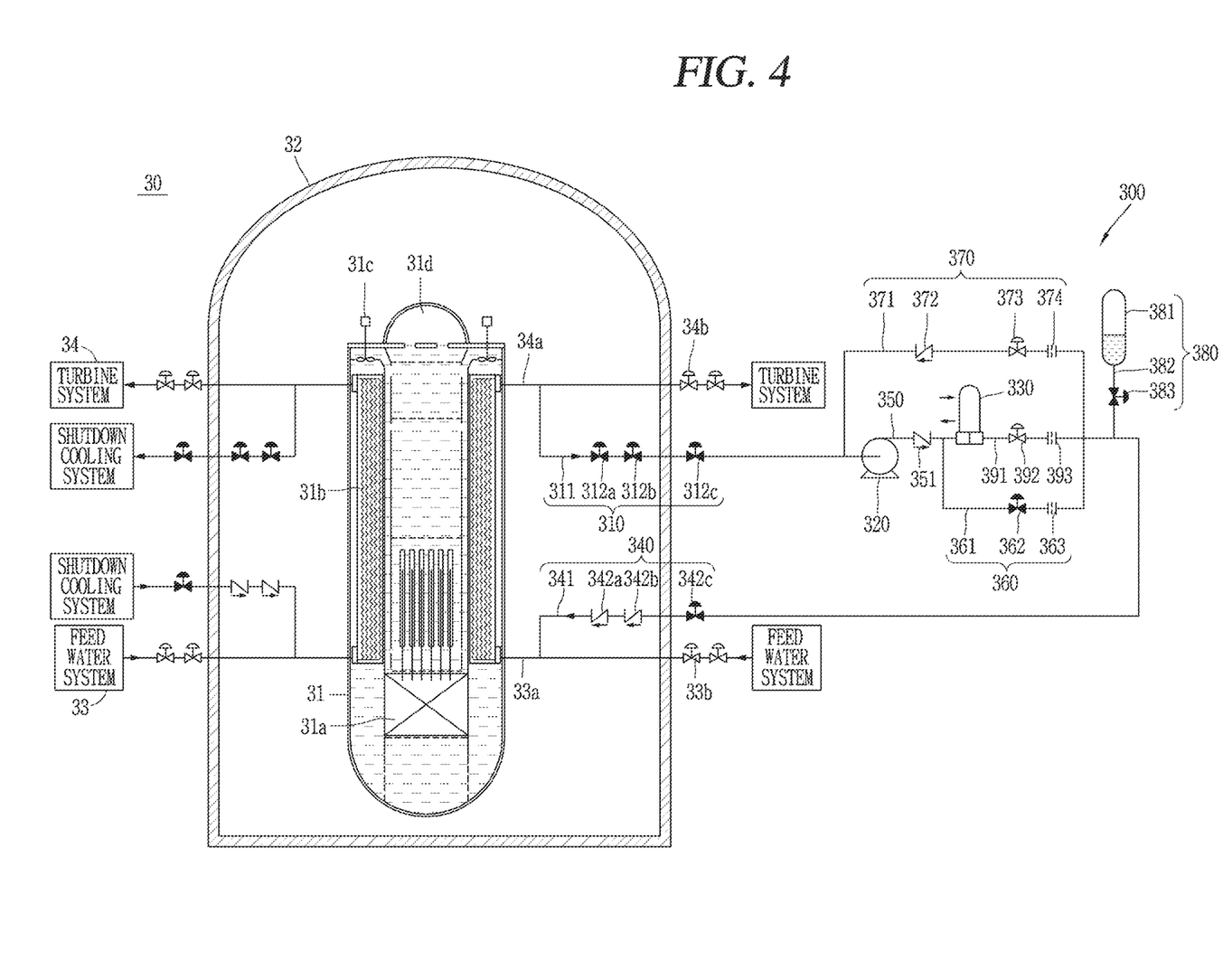
FIG. 4 is a conceptual view illustrating a shutdown cooling system and a nuclear facility having the same, in accordance with another embodiment of the present invention.

FIG. 4 is a conceptual view illustrating a shutdown cooling system 300 and a nuclear facility 30 having the same according to still another embodiment of the present invention.

A plate type steam generator 31b is configured in a form of at least one of a printed circuit type steam generator and a plate type steam generator.

The printed circuit type steam generator is a heat exchanger having a structure without a welded portion between plates of the steam generator by using a dense flow path arrangement by a photo-chemical etching technique and a diffusion bonding technique. Accordingly, the printed circuit type steam generator can be applied to a high temperature and high pressure environment, and has high integration and excellent heat exchange performance. The printed circuit type steam generator has advantages such as durability against the high temperature and high pressure environment, high integration, and excellent heat exchange performance, and thus its application range extends to very various fields, such as evaporator, condenser, cooler, radiator, heat exchanger, reactor and the like, in the area of an air conditioning system, a fuel cell, an automobile, a chemical process, a medical device, nuclear power, an information communication device, a cryogenic environment, and the like.

The plate type steam generator is generally configured in a manner of forming a flow channel by pressing plates, and coupling the plates by using gaskets or in a general welding or brazing manner. Accordingly, although the application fields of the plate type steam generator are similar to those of the printed circuit type steam generator, the plate type steam generator is more widely used in a low-pressure environment with low pressure. The heat exchange performance of the plate type steam generator is lower than that of the printed circuit type steam generator and higher than that of the shell-and-tube type steam generator. Also, compared with the printed circuit type steam generator 11b, the plate type steam generator is more simply fabricated.

In the present invention, unless otherwise specified, the plate type steam generator 31b refers to not only the general plate type steam generator and printed circuit type steam generator, but also any steam generator employing different plate processing or bonding manners.

A primary flow path and a secondary flow path of the plate type steam generator 31b may be designed in various forms. Since the plate type steam generator 31b exhibits a high integrated heat transfer performance of several tens of times or more, as compared with the shell-and-tube type steam generator 31b in the same volume, the size of the steam generator 31b can be easily reduced. As the size of the steam generator 31b is reduced, an arrangement space of the steam generator 31b can be saved. In addition, when the plate type steam generator is applied to the integral type reactor, a size of the reactor vessel can also be reduced.

Figure 5:
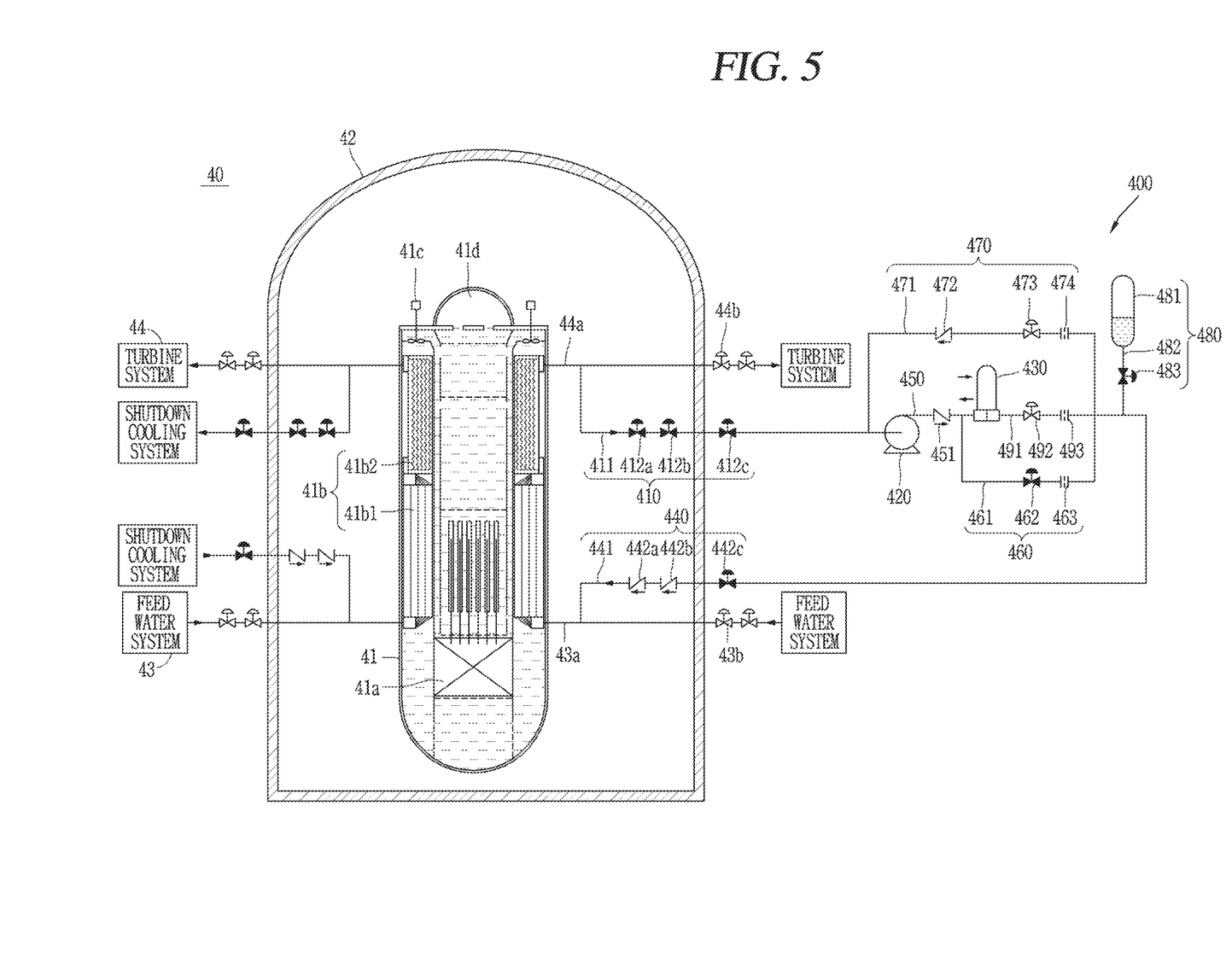
FIG. 5 is a conceptual view illustrating a shutdown cooling system and a nuclear facility having the same, in accordance with another embodiment of the present invention.

FIG. 5 is a conceptual view illustrating a shutdown cooling system 400 and a nuclear facility 40 having the same in accordance with still another embodiment of the present invention.

A steam generator 41b includes a mixed type steam generator 41b configured by combining a shell-and-tube type steam generator 41b1 and a plate type steam generator 41b2. The shell-and-tube type steam generator 41b1 illustrated in FIG. 5 is disposed below the plate type steam generator 41b2. A primary flow path of the shell-and-tube type steam generator 41b1 is formed by a shell, and a secondary flow path is formed by a tube. A feed water line 43a is connected to an inlet of the tube, and a steam line 44a is connected to an outlet of the plate type steam generator 41b2.

The shell-and-tube type steam generator 41b1 and the plate type steam generator 41b2 may be connected to each other by a connection nozzle or a connection line (not illustrated). Positions of the shell-and-tube type steam generator 41b1 and the plate type steam generator 41b2 may be switched with each other, and a plurality of shell-and-tube type steam generators 41b1 and a plurality of plate type steam generators 41b2 may also be combined with each other.

Figure 6:
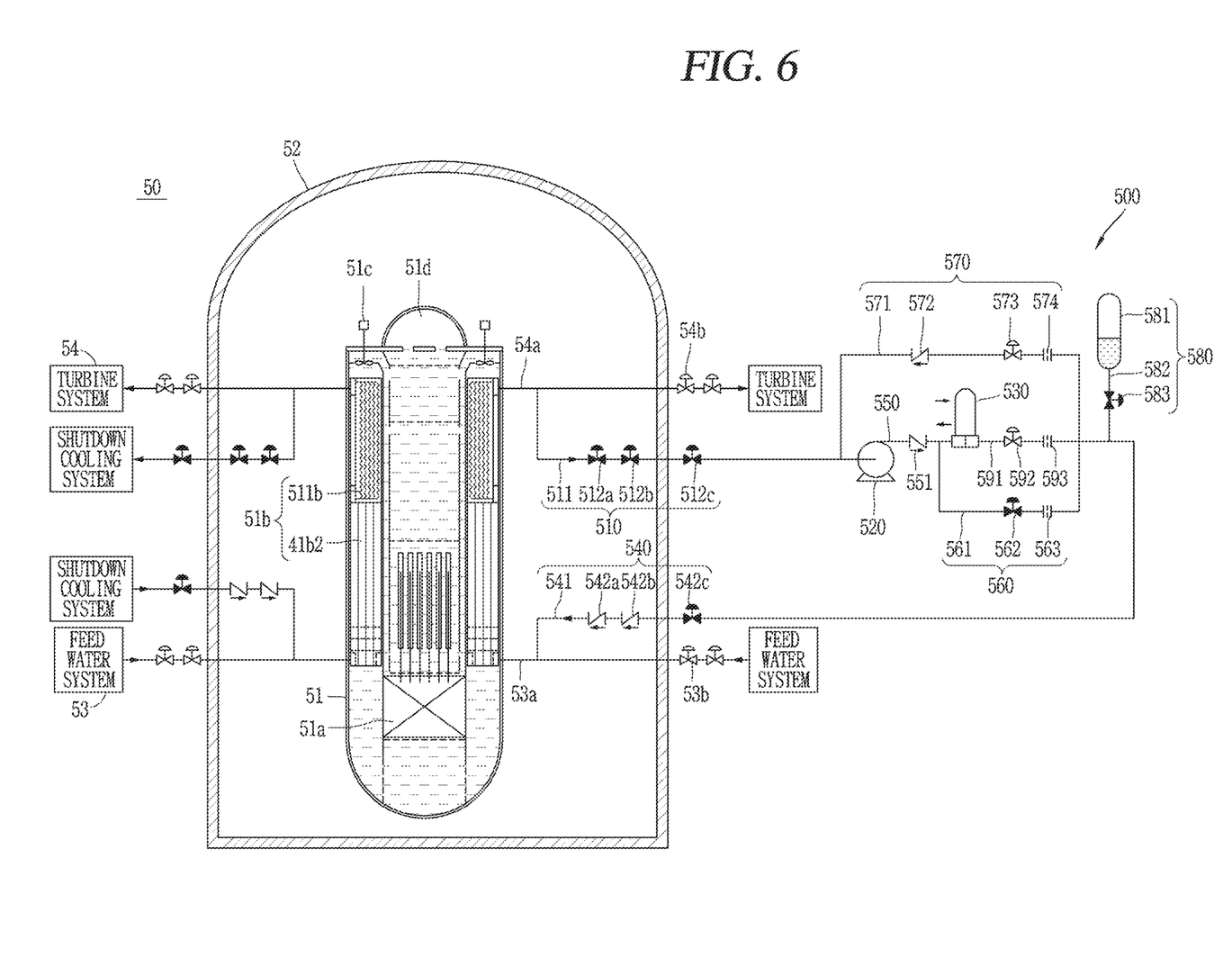
FIG. 6 is a conceptual view illustrating a shutdown cooling system and a nuclear facility having the same, in accordance with another embodiment of the present invention.

FIG. 6 is a conceptual view illustrating a shutdown cooling system 500 and a nuclear facility 50 having the same according to still another embodiment of the present invention.

A steam generator 51b corresponds to the mixed type steam generator 51b illustrated in FIG. 5. However, a primary flow path of a shell-and-tube type steam generator 51b1 is formed by a tube, and a secondary flow path is formed by a shell. A feed water line is connected to an inlet of the shell, and a steam line is connected to an outlet of the plate type steam generator 51b2.

Figure 7:
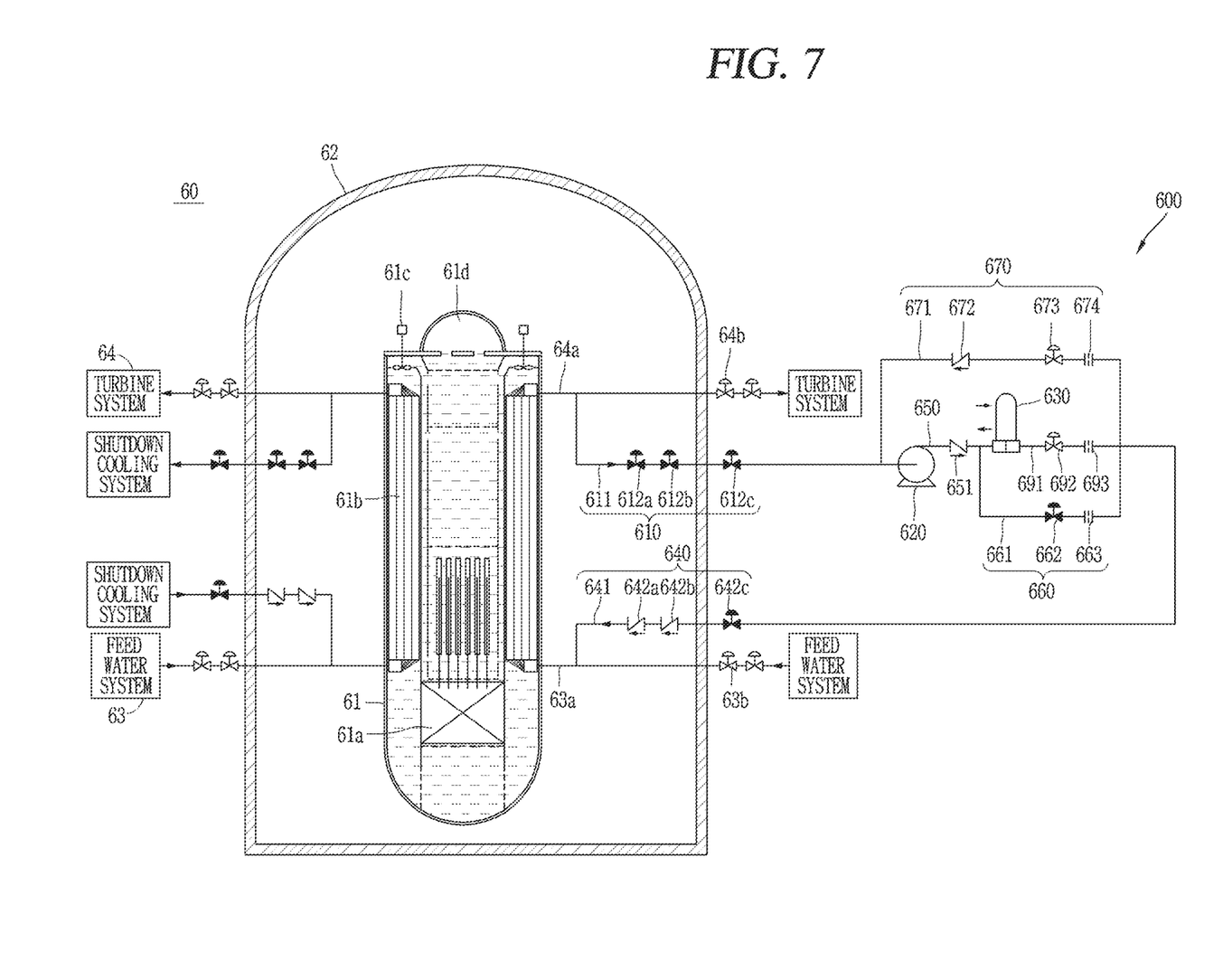
FIG. 7 is a conceptual view illustrating a shutdown cooling system and a nuclear facility having the same, in accordance with another embodiment of the present invention.

FIG. 7 is a conceptual view illustrating a shutdown cooling system 600 and a nuclear facility 60 having the same according to still another embodiment of the present invention.

In the shutdown cooling system 600 of the present invention, a pressure controller is optional. Therefore, the pressure controller may not be included in a condition that operation pressure is sufficiently generated in the shutdown cooling system 600, or in a condition of including a facility having a function similar to that of the pressure controller. The shutdown cooling system 600 illustrated in FIG. 7 does not include the pressure controller, unlike the other shutdown cooling systems described above.

Figure 8:
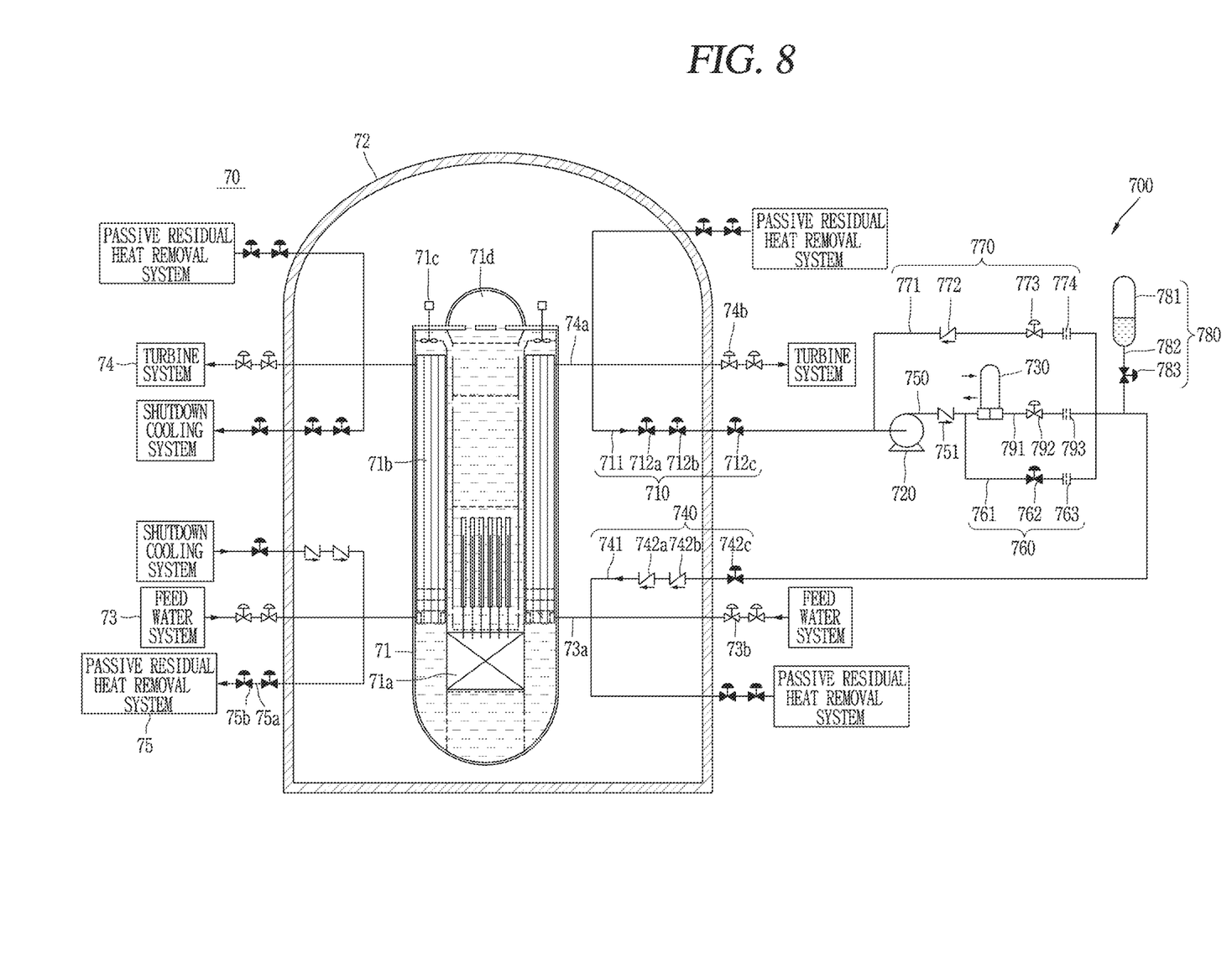
FIG. 8 is a conceptual view illustrating a shutdown cooling system and a nuclear facility having the same, in accordance with another embodiment of the present invention.

FIG. 8 is a conceptual view illustrating a shutdown cooling system 700 and a nuclear facility 70 having the same according to still another embodiment of the present invention.

The nuclear facility 70 includes a shutdown cooling system 700 and a passive residual heat removal system 75.

The passive residual heat removal system 75 primarily cools a reactor coolant system 71 prior to an operation of the shutdown cooling system 700 during an occurrence of an accident. The passive residual heat removal system 75, similar to the shutdown cooling system 700, may remove sensible heat of the reactor coolant system 71 and residual heat of a core 71a by circulating cooling water along a secondary flow path of a steam generator 71b.

When an accident occurs in the nuclear facility 70, valves 75b installed in a line 75a connected to the passive residual heat removal system 75 are open. The passive residual heat removal system 75 then cools the reactor from a normal operation temperature down to about 200° C. After the operation of the passive residual heat removal system 75, the shutdown cooling system 700 is operated to cool the reactor down to a reloading temperature of about 50° C.

The present invention has proposed that a line of a shutdown cooling system is connected to a feed water line and a steam line of a steam generator, and the shutdown cooling system is configured by using a secondary system. Meanwhile, the shutdown cooling system has been configured to selectively employ a pressure controller to mitigate a suction head. Also, the present invention has proposed a configuration for improving economical efficiency by selectively removing a component cooling system or improving safety with employing the component cooling system according to requirements of the shutdown cooling system depending on a nuclear facility. The present invention can eliminate a loss of coolant accident that is likely to be caused due to damage on a line of a shutdown cooling system used for low-temperature cooling for maintenance and the like of a nuclear facility. The present invention has proposed a fundamental solution to problems of simplifying a shutdown cooling operation, and securing a suction head and a shutdown cooling flow rate of a shutdown cooling pump.

Accordingly, when the shutdown cooling system according to the present invention is applied, possibility of occurrence of a loss of coolant accident can greatly be reduced by virtue of a removal of a connection nozzle of the shutdown cooling system of a reactor vessel so as to improve safety, a suction head condition of the shutdown cooling system can greatly be improved so as to remarkably simplify a pump design and an operation condition, and the shutdown cooling flow rate can increase so as to reduce a time required for shutdown cooling and thus improve economical efficiency. Meanwhile, when the shutdown cooling system according to the present invention is applied to an integral type reactor, a flow condition of the shutdown cooling system may not greatly change even according to a state of a reactor coolant system, such as opening of a reactor vessel for maintenance, which may result in simplifying the operation of the shutdown cooling system.

The above-described shutdown cooling system and the nuclear facility having the same are not limited to the configurations and methods of the above-described embodiments, but those embodiments may be configured by selectively combining all or part of each embodiment so as to derive various variations.

DESCRIPTION OF THE REFERENCE NUMERALS 10, 20, 30, 40, 50, 60, 70: nuclear facility
11b, 21b, 31b, 41b, 51b, 61b, 71b: steam generator
100, 200, 300, 400, 500, 600, 700: shutdown cooling system
110, 210, 310, 410, 510, 610, 710: steam line connecting portion
120, 220, 320, 420, 520, 620, 720: shutdown cooling pump
130, 230, 330, 430, 530, 630, 730: shutdown cooling heat exchanger
140, 240, 340, 440, 540, 640, 740: feed water line connecting portion
160, 260, 360, 460, 560, 660, 760: bypass channel
170, 270, 370, 470, 570, 670, 770: recirculation channel
180, 280, 380, 480, 580, 780: pressure controller

INDUSTRIAL APPLICABILITY

The present invention can be applied to industrial fields related to nuclear facilities including a shutdown cooling system.

The invention claimed is:

1. A shutdown cooling system for use in a nuclear facility, comprising:
   a steam line connecting portion branched from a steam line to receive heated secondary fluid through the steam line, the steam line connected to a turbine system and an outlet of a secondary flow path of a steam generator;
   a shutdown cooling heat exchanger to receive the heated secondary fluid introduced into the shutdown cooling system through the steam line connecting portion, cool the heated secondary fluid, which has been heated up while passing through the secondary flow path of the steam generator, and discharge cooled secondary fluid into a heat exchanger channel connected to a flow path of the shutdown cooling heat exchanger;
   a shutdown cooling pump configured to perform shutdown cooling of a reactor upon a normal shutdown of the reactor after primary cooling of a reactor coolant system or upon an occurrence of an accident, to form a circulation flow of secondary fluid circulating along the steam generator and the shutdown cooling heat exchanger;
   a feed water line connecting portion connected to the heat exchanger channel and jointed to a feed water line which is connected to a feed water system and an inlet of the secondary flow path of the steam generator, to supply secondary fluid cooled in the shutdown cooling heat exchanger to the steam generator through the feed water line;
   a bypass channel branched from a connection channel and connected to a discharge line to control a flow rate of the heated secondary fluid supplied from the shutdown cooling pump to the shutdown cooling heat exchanger; and
   wherein the connection channel forms a flow path connecting the shutdown cooling pump and the shutdown cooling heat exchanger, and the discharge line is connected to the heat exchanger channel and the feed water line.

2. The system of claim 1, wherein the steam line connecting portion comprises:
   a suction line connected to the steam line and the shutdown cooling pump; and
   a first valve installed in the suction line, the first valve closed during a normal operation of the reactor and opened after the primary cooling of the reactor coolant system,
   wherein the feed water line connecting portion comprises:

a second valve installed in the discharge line, the second valve closed during the normal operation of the reactor and opened after the primary cooling of the reactor coolant system.

3. The system of claim 2, further comprising:
a check valve installed in the connection channel to prevent a formation of a reverse flow from the shutdown cooling heat exchanger toward the shutdown cooling pump.

4. The system of claim 3, further comprising a recirculation channel branched from the heat exchanger channel and connected to the suction line to form a flow path for resupplying the cooling water discharged from the shutdown cooling heat exchanger to the shutdown cooling pump.

5. The system of claim 1, further comprising a pressure controller connected to a flow path of the circulation flow to pressurize the flow path of the circulation flow, such that operation pressure of the shutdown cooling system is maintained to be higher than preset pressure.

6. The system of claim 5, wherein the pressure controller pressurizes the flow path of the circulation flow using gas.

7. The system of claim 5, wherein the pressure controller pressurizes the flow path of the circulation flow by heating up steam using a heater.

8. The system of claim 1, wherein the steam generator comprises at least one of:
a shell-and-tube type steam generator provided with a primary flow path configured as one of a shell and a tube, and a secondary flow path configured as another one;
a plate type steam generator configured as at least one of a printed circuit type steam generator and a plate type steam generator; and
a mixed type steam generator of the shell-and-tube type steam generator and the plate type steam generator.

9. The system of claim 1, wherein the shutdown cooling heat exchanger comprises at least one of:
a shell-and-tube type heat exchanger provided with a secondary flow path configured as one of a shell and a tube, and a tertiary flow path configured as another one; and
a plate type heat exchanger configured as at least one of a printed circuit type steam generator and a plate type steam generator.

10. The system of claim 9, wherein the tertiary flow path of the shutdown cooling heat exchanger is supplied with at least one of component cooling water supplied from a component cooling system, seawater supplied from the sea, and atmosphere supplied from a cooling tower.

11. The system of claim 1, wherein the shutdown cooling pump is a feed water pump or an auxiliary feed water pump.

12. A nuclear facility, comprising:
a steam generator having an inlet of a secondary flow path connected to a feed water line for receiving a secondary fluid from a feed water system, and an outlet of the secondary flow path connected to a steam line for supplying the secondary fluid to a turbine system; and
a shutdown cooling system for use in the nuclear facility configured to perform shutdown cooling of a reactor during a normal shutdown or an accident of the reactor,
wherein the shutdown cooling system comprises:
a steam line connecting portion branched from a steam line for receiving heated secondary fluid through the steam line, the steam line connected to a turbine system and the outlet of the secondary flow path of the steam generator;
a shutdown cooling heat exchanger to receive the heated secondary fluid through the steam line connecting portion, cool the heated secondary fluid, which has been heated up while passing through the secondary flow path of the steam generator;
a shutdown cooling pump configured to perform the shutdown cooling of the reactor to form a circulation flow of secondary fluid circulating along the steam generator and the shutdown cooling heat exchanger, upon a normal shutdown of the reactor after primary cooling of a reactor coolant system or upon an occurrence of an accident;
a feed water line connecting portion joined to the feed water line which is connected to a feed water system and the inlet of the secondary flow path of the steam generator to supply secondary fluid cooled in the shutdown cooling heat exchanger to the steam generator through the feed water line;
a bypass channel branched from a connection channel and connected to a discharge line to bypass the shutdown cooling heat exchanger to control a flow rate of the cooling water supplied from the shutdown cooling pump to the shutdown cooling heat exchanger; and
wherein the connection channel forms a flow path connecting the shutdown cooling pump and the shutdown cooling heat exchanger, and the discharge line is connected to the heat exchanger channel and the feed water line.

13. The nuclear facility of claim 12, further comprising (a) a passive residual heat removal system or (b) a feed water system and a secondary system configured to primarily cool the reactor coolant system prior to an operation of the shutdown cooling system during an accident.

* * * * *